United States Patent [19]

Lakamp

[11] 3,867,898

[45] Feb. 25, 1975

[54] DETACHABLY MOUNTABLE VISUAL PROXIMITY AND ALIGNMENT INDICATOR FOR CONNECTABLE VEHICLES

[76] Inventor: Ernest A. Lakamp, 431 South Shore Dr., Forest Lake, Minn. 55025

[22] Filed: Nov. 21, 1973

[21] Appl. No.: 417,975

[52] U.S. Cl. .................................. 116/28 R, 33/264
[51] Int. Cl. ............................................. B60q 1/30
[58] Field of Search .......... 116/28 R, 173, 174, 175; 33/264; 24/81 G, 261 D, 81 AT, 81 CL; 248/41, 226 E; 40/11 A, 125 H

[56] References Cited
UNITED STATES PATENTS

| | | | |
|---|---|---|---|
| 1,390,389 | 9/1921 | Rosenfeld | 248/226 E |
| 2,164,985 | 7/1939 | Cardarelli | 40/125 H |
| 2,284,209 | 5/1942 | Holm | 116/173 |
| 2,815,732 | 12/1957 | Majors | 33/264 |

*Primary Examiner*—S. Clement Swisher
*Assistant Examiner*—Denis E. Corr
*Attorney, Agent, or Firm*—Jacobson and Johnson

[57] ABSTRACT

A set of detachably mountable visual indicators are provided with a first visual indicator for pressure mounting on a driven vehicle and a second visual indicator for pressure mounting on a vehicle to be towably connected to the driven vehicle.

1 Claim, 7 Drawing Figures

PATENTED FEB 25 1975 3,867,898

DETACHABLY MOUNTABLE VISUAL PROXIMITY AND ALIGNMENT INDICATOR FOR CONNECTABLE VEHICLES

BACKGROUND OF THE INVENTION

1. Field of the Invention

This invention relates generally to indicating devices and, more specifically, to visual indicating devices to assist an automobile driver in connection of a trailer to an automobile.

2. Description of the Prior Art.

One of the difficulties in connecting a trailer to a vehicle such as an automobile is the proper positioning of the bumper hitch of the automobile with respect to the trailer tongue, that is, the bumper hitch on the automobile is generally located in the center of the rear bumper of the automobile where it cannot be seen by the driver when he is in the driver's seat of the automobile. Usually, the automobile is backed up to the trailer until the trailer tongue is located somewhat proximate to the bumper hitch on the automobile. If the trailer is light the operator can then move the trailer the final few inches until the bumper hitch is properly positioned with respect to the trailer tongue. However, some trailers are so heavy that it is nearly impossible for an operator to move the trailer without assistance. Consequently, the driver must jockey the automobile until the bumper hitch is properly positioned with respect to the trailer tongue. After this time-consuming and frustrating process of jockeying the automobile, the driver gets out and attaches the trailer tongue to the bumper hitch on the automobile.

One of the difficulties in the process of jockeying the automobile is that from the driver's seat, the driver cannot see either the bumper hitch on the automobile or the trailer tongue on the trailer. Consequently, the positioning of the bumper hitch with respect to the trailer requires considerable trial and error. That is, the driver must back up the automobile, stop, get out and see if he is in proper position for connecting the trailer tongue to the bumper hitch. If he is not, he must get in the automobile and reposition the automobile hoping that he will now have the bumper hitch in a position for connection to the trailer tongue. Besides being time-consuming, the driver can cause damage to both the automobile and the trailer if he would back up too far and jam the trailer tongue into the rear of the automobile. Consequently, the driver needs someone available to direct him as he backs the automobile up to the trailer if he is to connect the trailer to the automobile with a minimum amount of grief.

The present invention provides a solution to the problem of positioning the bumper hitch with respect to the trailer tongue by providing a two-piece set of visual indicators which can be detachably mounted to the ball on the bumper hitch of the automobile and the trailer tongue on the trailer.

BRIEF SUMMARY OF THE INVENTION

Briefly, the invention comprises detachable mounted visual indicators which can be mounted to the bumper hitch and the trailer tongue. Visual indicators comprise a first section for pressure engaging the ball of the bumper hitch and a second section which extends upward sufficiently so an operator sitting in the driver's seat can see the indicator through the back window of the automobile. The second visual indicator is also pressure mounted to the trailer hitch and has a section which extends upward so an operator sitting in the driver's seat can see the visual indicator through the rear window of the automobile. The two indicators allow the operator to simultaneously know at all times the proximity and alignment of the bumper hitch ball with respect to the trailer tongue without the driver having to get out of the driver's seat.

DESCRIPTION OF THE PREFERRED EMBODIMENT

Figure 1:
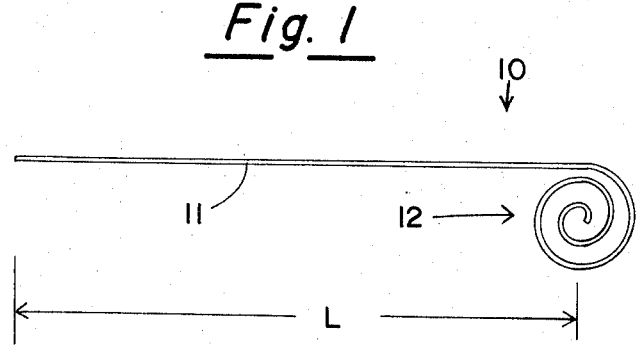
FIG. 1 shows the visual indicator for attaching to the bumper hitch of an automobile.
Figure 2:
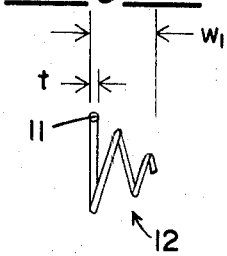
FIG. 2 is an end view of the visual indicator of FIG. 1.

Referring to the drawings, reference numeral 10 designates a one-piece visual indicator for mounting on a ball bumper hitch. Visual indicator 10 comprises an indicating section 11 and a pressure mounting section 12. Indicating section 11 is a straight elongated portion having a length L. The length L can be any dimension as long as at least a portion of indicating section 11 is sufficiently long to be seen through the back window of the automobile by a driver located in the driver's seat of the automobile when pressure section 12 is mounted on the bumper hitch.

Pressure mounting section 12 comprises a helical coil which is preferably formed out of the same material as straight indicating section 11. Helical coil 12 has a dimension $W_1$ which is slightly less than the diameter of the ball on the bumper hitch. Helical coil section 12 is made from resilient material so that coil section 12 can be forced onto the ball on the bumper hitch. Because helical coil section 12 is slightly smaller than the diameter of the ball on the bumper hitch and because helical coil section 12 is formed from resilient material, it is apparent that helical coil section 12 can also be called a pressure mounting section for engaging the ball on a bumper hitch. Coil section 12 or pressure mounting section 12 holds visual indicator 10 in a vertical position so the top portion of indicator 10 can be seen by a driver sitting in the driver's seat of an automobile. While it is apparent that indicating section of indicator 10 need not be pointed vertically upward, it is apparent that the vertical position is preferred. When visual indicator 10 projects vertically upward from the bumper ball hitch, the driver knows exactly where the bumper ball hitch is located.

Figure 5:
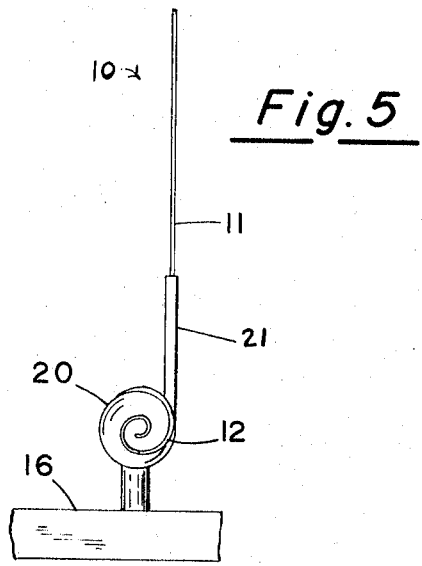
FIG. 5 is a front elevation view showing the visual indicator mounted on a ball hitch.
Figure 6:
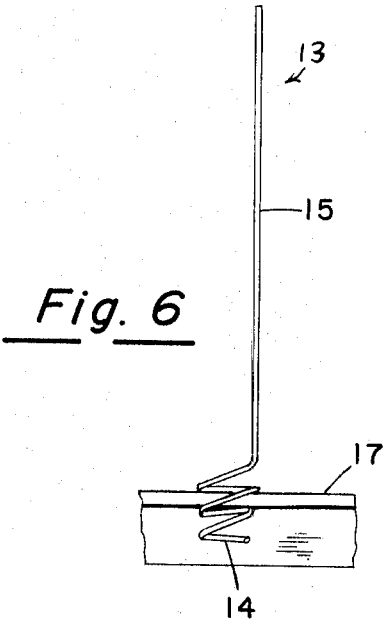
FIG. 6 is a side view of the visual indicator mounted on a trailer tongue.

Reference should be made to FIG. 5 which shows visual indicator 10 located on the bumper hitch ball with indicating section 11 projecting vertically upward. The bumper ball hitch is shown with helical pressure mounting member 12 in pressure engagement with ball 20. The helical coil spring positioned around ball 20 firmly holds visual indicator 10 in a position where it can be observed through the rear window of the automobile. In the embodiment shown in FIG. 5, I provide a stiffener 21 located along the base of elongated member 11. Stiffener 21 is for the purpose of preventing any whipping action or motion of visual indicator during the backing of the automobile. This can be accomplished in two ways, i.e., by the use of a stiffener at the base of the indicator or by the use of a heavier material in the indicating section. It is preferred to use a stiffener at the base since it makes for a simpler unit which is easier to mount as well as reduces the inertia of the visual indicating section; that is, with a larger rod, increased mass causes the indication section to swing more easily unless one uses an inflexible rod. However, the flexible rod is usually too heavy to mount easily to the bumper ball hitch.

In the preferred embodiment, visual indicator 10 has a length of approximately 32 inches and the indicator is round spring steel having a diameter on the order of 1/16 inch. These dimensions satisfy the relationship of a low mass indicating section which can be supported and held vertically by the resiliency of the material used to form the visual indicator as well as being able to be easily attached or detached from the bumper ball hitch.

Figure 3:
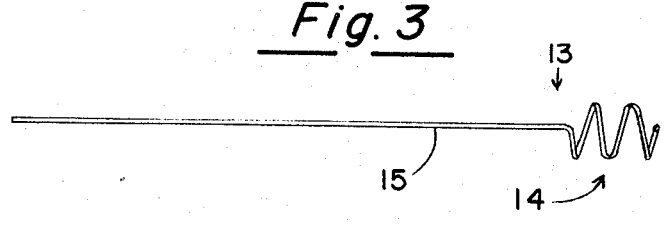
FIG. 3 shows a visual indicator for attachment to the trailer tongue.
Figure 4:
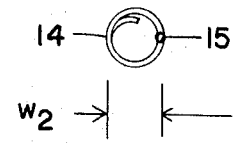
FIG. 4 is an end view of the visual indicator of FIG. 3.

Referring to FIGS. 3 and 4, a one-piece visual indicator for mounting on the trailer hitch is designated by reference numeral 13 and comprises an elongated straight section 15 which can be partially seen by a driver sitting in the driver's seat of the automobile. Visual indicator 13 has a coil spring section 14 for detachably mounting to the trailer tongue. The indicator coils in spring section 14 are spaced sufficiently close together so that the coils can be wedged around the trailer hitch 17 to thereby hold visual indicator 13 in a vertical position on trailer hitch 17. In the preferred embodiment, the coil spring sections have a spacing of approximately 3/32nds of an inch to 5/32nds of an inch with a ½ inch diameter $W_2$. Coil spring section 14 is also made from a resilient material such as round spring steel and has a diameter and a length on the order of visual indicator 10. Note, visual indicator 13 is mounted on a trailer which is not moved and therefore, it is not necessary to control the mass of indicator 13.

Figure 7:
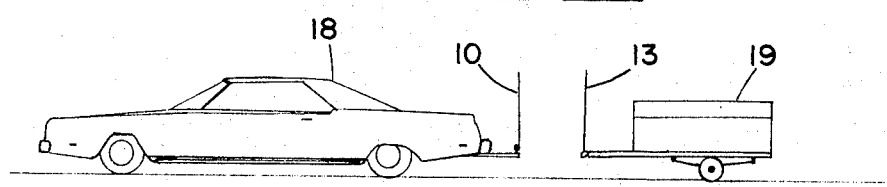
FIG. 7 is a side elevation view of the visual indicators mounted on an automobile and a trailer.

Referring to FIG. 7, visual indicator 10 is shown mounted on the bumper ball hitch of an automobile 18 and visual indicator 13 is shown mounted on the trailer hitch of trailer 19. The automobile driver usually stores detachable mounted visual indicators 10 and 13 in the trunk of his automobile or in the trailer and mounts the indicators when he is ready to connect the trailer to the automobile. When the driver is ready to attach the trailer to the bumper hitch, he removes visual indicator 10 and forces the helical spring section 12 over the bumper hitch ball. He then adjusts visual indicator 10 until it is vertically positioned over the bumper hitch ball. This exactly locates the ball hitch position to the driver of the automobile. It is apparent that one of the advantages of the preferred embodiment is that one can position and located the helical spring in almost any position with respect to the ball on the bumper hitch. The driver then places visual indicator 13 on the trailer hitch so it can also be readily observable from the rear of the driver's seat of the automobile. Visual indicator 13 is mounted on the trailer hitch by slipping the coil wedges over the flange on the trailer hitch. The driver then gets into the automobile and backs the automobile up to the trailer by using the visual indicators 10 and 13 as a guide. By the utilization of visual indicators as a guide, the operator can provide exact two dimensional location of the trailer hitch with respect to the bumper hitch on the automobile. That is, the visual indicators allow the driver to back the car until the bumper hitch is exactly positioned under the trailer hitch.

In an alternate embodiment, I place a light reflective material on the indicators to enable one to easily see the visual indicators.

I claim:

1. A set of visual indicators for mounting on a towable unit and an operator driven vehicle having a ball hitch of predetermined diameter comprising:

a first indicator for mounting on an operator driven vehicle having a ball hitch of predetermined diameter which cannot be seen when the operator is in the driver's seat of the vehicle and a second visual indicator for mounting on a towable unit which is to be attached to the hitch located on the operator driven vehicle;

said first visual indicator including a first section having pressure mounting means adaptable for detachably mounting on the ball hitch of a vehicle, said pressure mounting means comprising a resilient helical coil section adaptable for mounting contiguously on a ball hitch throughout the extent of said helical coil section, said helical coil section having a diameter less than the predetermined diameter of the ball hitch, said first visual indicator adapted to extend tangentially from the ball hitch to thereby allow the hitch on the towable unit to extend over the ball without disturbing said first visual indicator, said first visual indicator adapted to extend from the ball hitch of the vehicle a sufficient distance so as to enable the operator to see at least a portion of the visual indicator from the operator's seat of the operator driven vehicle, said first visual indicator having sufficient rigidity so as not to sway when an operator driven vehicle is moved to thereby provide a visual indicator to the operator of the vehicle as to the position of a ball hitch on an operator driven vehicle, said second visual indicator having pressure mounting means for detachably mounting to the flange of a hitch of the towable unit, said pressure mounting means comprising a resilient coil spring for wedging on the flange of the towable unit, a portion of said second visual indicator adapted to extend upward from the towable unit sufficient distance so that at least a portion of said second visual indicator can also be seen by an operator sitting in the operator's seat of a vehicle, said first visual indicator and said second visual indicator coacting to thereby provide the operator of a vehicle with the relative position of a bumper hitch and a towable vehicle so that the operator can align the hitch of a vehicle with the hitch of the towable unit.

\* \* \* \* \*